United States Patent [19]
Carabetta et al.

[11] Patent Number: 5,260,640
[45] Date of Patent: Nov. 9, 1993

[54] METHOD OF AND SYSTEM FOR PRODUCING ELECTRICAL POWER

[75] Inventors: Ralph A. Carabetta; Gary E. Staats, both of Pittsburgh, Pa.; John C. Cutting, Point Pleasant, N.J.

[73] Assignee: The United States of America as represented by the United States Department of Energy, Washington, D.C.

[21] Appl. No.: 986,828

[22] Filed: Dec. 8, 1992

Related U.S. Application Data

[63] Continuation-in-part of Ser. No. 826,697, Jan. 28, 1992.

[51] Int. Cl.$^5$ .......................................... H02K 44/08
[52] U.S. Cl. ..................................... 322/2 R; 310/11
[58] Field of Search ................. 322/2 R; 310/11, 300; 429/30, 32, 33

[56] References Cited

U.S. PATENT DOCUMENTS

| | | | |
|---|---|---|---|
| 3,546,499 | 12/1970 | Somers | 310/11 |
| 3,622,817 | 11/1971 | Isaacson | 310/11 |
| 3,878,409 | 4/1975 | Gill et al. | 310/11 |
| 3,878,410 | 4/1975 | Petrick et al. | 310/11 |
| 3,895,243 | 7/1975 | Amend et al. | 310/11 |
| 4,107,557 | 8/1978 | Shepherd | 310/11 |
| 4,345,173 | 8/1982 | Marchant et al. | 310/11 |
| 4,381,463 | 4/1983 | Branover | 310/11 |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,510,212 | 4/1985 | Fraioli | 429/30 |
| 4,526,812 | 7/1985 | Iacovangelo et al. | 427/115 |
| 4,540,640 | 9/1985 | Iacovangelo et al. | 429/41 |
| 4,548,877 | 10/1985 | Iacovangelo et al. | 429/41 |
| 4,581,303 | 4/1986 | Pasco et al. | 429/46 |
| 4,644,751 | 2/1987 | Hsu | 60/676 |
| 4,765,349 | 8/1988 | Kagawa | 131/327 |
| 4,883,497 | 11/1989 | Claar et al. | 429/33 X |
| 4,959,566 | 9/1990 | Dobran | 310/11 |
| 5,055,724 | 10/1991 | Berry | 310/11 |
| 5,086,234 | 2/1992 | Shiota et al. | 310/11 X |

Primary Examiner—Kristine L. Peckman
Attorney, Agent, or Firm—Hugh Glenn; Robert J. Fisher; William R. Moser

[57] ABSTRACT

A method and system for converting the chemical energy of methane to electrical energy. Methane is thermally decomposed to hydrogen and carbon in a decomposing unit at a temperature not less than about 1200° K. and at a pressure at least slightly above atmospheric pressure. Carbon and substantially pure oxygen and a cesium or potassium seed material is transmitted to a combustor which is maintained at a pressure of at least about 50 atmospheres to combust the carbon and oxygen and provide an ionized plasma having a temperature not less than about 2800° K. The ionized plasma is accelerated to a velocity not less than about 1000 m/sec and transported through an MHD generator having a magnetic field in the range of from about 4 to about 6 Tesla to generate dc power. The ionized plasma is de-accelerated and passed from the MHD generator in heat exchange relationship with the methane to heat same for decomposition and or reaction, and thereafter any cesium or potassium seed material is recovered and transported to the combustor, and the dc power from the MHD generator is converted to ac power.

14 Claims, 4 Drawing Sheets

METHOD OF AND SYSTEM FOR PRODUCING ELECTRICAL POWER

CONTRACTUAL ORIGIN OF THE INVENTION

The United States Government has rights in this invention pursuant to the employee-employer relationship between the inventors and the U.S. Department of Energy at the Pittsburgh Energy Technology Center.

RELATED APPLICATION

This is a continuation-in-part of copending application Ser. No. 07/826,697, filed Jan. 28, 1992.

BACKGROUND OF THE INVENTION

This invention relates to an improved method and means for converting the energy of readily occurring natural fuel which is plentiful in the United States to electrical energy through a magnetohydrodynamic (MHD) generator. More specifically, the invention relates to an overall concept of using methane gas to provide a carbon feed for a MHD generator in combination with substantially pure oxygen to provide an MHD electrical generating system which produces little or no pollutants to the atmosphere and which can produce overall cycle efficiency in excess of 70%. Moreover, with slight modification, the system can be adapted to use coal, which is the most plentiful fossil fuel in the United States. An additional option to the invention is the provision of a methanol production facility which in combination with the original concept is highly economic.

Natural gas is approximately 99% methane and this invention is in the use of methane and substantially pure oxygen as feed materials for a MHD generator.

In another aspect of the invention, a fuel cell is advantageously combined with the MHD generator because the methane is decomposed to carbon which is used in the MHD generator and hydrogen which may be transferred to the fuel cell of the molten carbonate or solid oxide type, both of which can produce additional power.

OBJECTS OF THE INVENTION

Accordingly, an object of the invention is to provide a high efficiency system for the production of electrical power using natural gas as a principal fuel or coal as a principal fuel which produces little, if any, waste material.

Another object of the invention is to provide a system of the type set forth in which the overall cycle efficiency is in excess of 70%.

Yet another object of the invention is to provide a system which produces carbon monoxide from natural gas and steam as a feed with oxygen to a MHD generator.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE INVENTION

Figure 1:
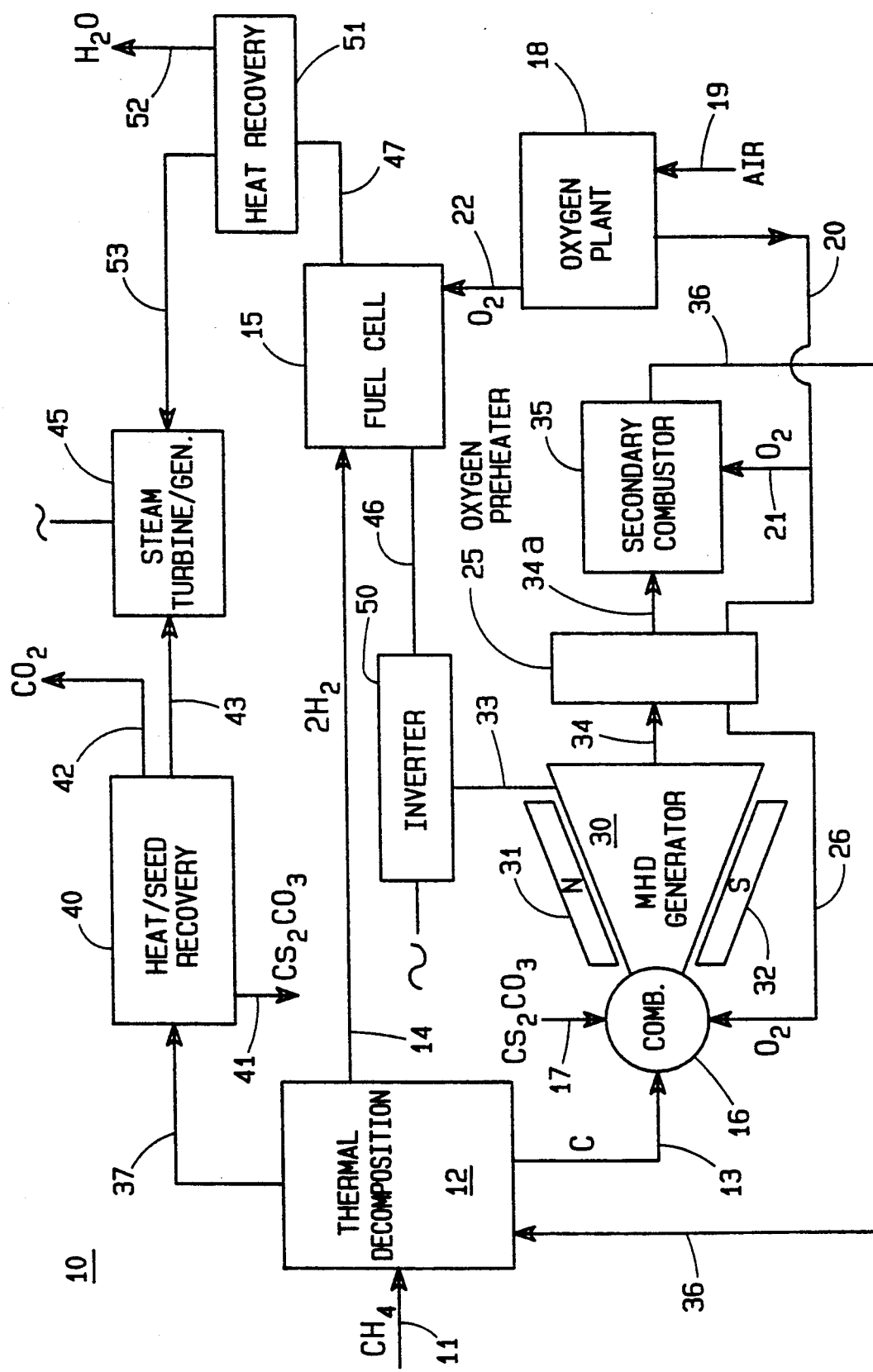
FIG. 1 is a schematic flow diagram of the invention.

In FIG. 1, there is an MHD generating system 10 including a source of methane or natural gas not shown, which delivers methane through a conduit 11 to a thermal decomposition unit 12. In the thermal decomposition unit 12, methane is decomposed to hydrogen and carbon, the carbon leaving through a line 13 and the hydrogen leaving through a line 14. The carbon is transmitted via line 13 to a combustor 16 and the hydrogen gas is transmitted via the line 14 to a fuel cell 15 of the solid oxide or advanced molten carbonate type. Such fuel cells are disclosed in Claar et al. U.S. Pat. No. 4,883,497, McPheeters et al. U.S. Pat. No. 4,765,349, Poeppel et al U.S. Pat. No. 4,476,196, Herceg U.S. Pat. No. 4,476,197, Ackerman et al. U.S. Pat. No. 4,476,198, Fraioli U.S. Pat. No. 4,510,212, Pasco et al. U.S. Pat. No. 4,581,303, Iacovangelo et al. U.S. Pat. Nos. 4,548,877, 4,540,640, and 4,526,812.

The combustor 16 receives the carbon via line 13 from the methane decomposer 12 and a suitable seed material for an MHD generator. Illustrated in the drawing is cesium carbonate which enters via a line 17 to the combustor unit 16. In addition to cesium carbonate, potassium carbonate may also be used, as is well known. The combustor 16 also receives via a line 26 preheated oxygen delivered to the combustor from an oxygen plant 18 which receives air through an inlet 19 and produces substantially pure oxygen through an exit line 20 which is transmitted to an oxygen preheater 25 where it is heated by coming into heat exchange relation with the outlet gases from the MHD generator 30. By substantially pure oxygen, we mean greater than 99% pure oxygen. The heated oxygen exits the preheater 25 via a line 26 to the combustor 16. Less pure oxygen may be used but then the various oxides of nitrogen would have to be dealt with to minimize adverse effects on the environment.

The MHD generator 30 is well known and is of the plasma type described in U.S. Pat. No. 4,345,173 to Marchant et al., U.S. Pat. No. 3,895,243 to Amend et al. issued Jul. 15, 1975, the disclosures of which are incorporated herein by reference.

The MHD generator 30 is enclosed within a magnet having a north pole 31 and a south pole 32 and delivers gas or plasma at a much elevated temperature indicated by arrow 34 which is used to preheat the oxygen in the oxygen preheater 25 and exits therefrom in a line 34a to a secondary combustor 35. In the secondary combustor 35, oxygen enters via a line 21 from the oxygen plant 18 and gases react therein, as will be hereinafter described, and exit therefrom via a line 36 which passes through the thermal decomposition unit 12. The gases from the secondary combustor 35 pass in heat exchange relationship with the natural gas entering the thermal decomposer 12 via a line 11 to heat the gases therein to the desired temperature and exit the thermal decomposer 12 via a line 37 which leads to a heat/seed recovery unit 40. In the heat/seed recovery unit 40, cesium carbonate or the potassium carbonate seed is recovered and delivered via a line 41 either to a supply unit, not shown, or to line 17 for reintroduction into the combustor 16. The gases from the secondary combustor without the cesium carbonate seed are vented via a line 42 and consist principally of carbon dioxide. The energy of the combustion gases is used in the heat/seed recovery unit 40 to raise steam which is transmitted via a line 43 to a steam turbine generator 45 for the production of electricity.

As before stated, the fuel cell 15 receives hydrogen as a fuel via a line 14 from the thermal decomposition of methane in the decomposer 12 and oxygen from the oxygen plant 18 via a line 22. The oxygen and the hydrogen fuel are passed through the fuel cell 15 to produce dc power which is transmitted via a line 46 to an inverter 50 and the thermal energy from the fuel cell, in the form of hot water, is transmitted via a line 47 to a heat recovery unit 51 from which the heat is extracted and used to produce steam which is transmitted via line 53 to the steam turbine with waste water being dumped from the heat recovery unit 51 via line 52.

The power generated from the MHD generator 30 is dc power and is transmitted via a line 33 to the inverter 50 for conversion to ac power along with the power generated from the fuel cell 15.

In an example of the system 10, methane flow rate to the thermal decomposer 12 is 10 kg per second at a temperature of 300° K. The thermal decomposition takes place at a temperature in the range of from about 1200° K. to about 1500° K. and at a pressure in the range of from slightly about atmospheric or about 1.1 atmospheres to about 20 atmospheres. It is preferred that the decomposition of methane take place at about 1500° K. and at about 10 atmospheres producing a carbon flow rate of 7.5 kg per second at a temperature of about 1500° K. A pressure range of from about 5 to about 20 atmospheres is acceptable. The hydrogen flow rate from the thermal decomposer 12 is about 2.5 kg per second also at a temperature of about 1500° K. The combustion product input through line 36 is at a flow rate of about 28.2 kg per second with an inlet temperature of about 2600° K. and an outlet temperature of about 1700° K. at described system parameters.

The combustor 16 burns carbon and relatively pure oxygen at a pressure in the range of from about 50 atmospheres to about 500 atmospheres with 500 atmospheres being preferred if carbon dioxide is the principal product and 50 atmospheres being sufficient if only carbon monoxide is produced. If lower pressures were used, then efficiencies would not be as high and larger equipment would be required. Although potassium carbonate may be used in lieu of the cesium carbonate shown, cesium carbonate is preferred. In the combustor 16, the stagnation pressure is about 500 atmospheres and the stagnation temperature is about 4520° K. The combustor 16 is operated with excess carbon such that the stoichiometry is about 0.91 with an oxygen flow rate of 18.18 kg per second, the incoming oxygen having a temperature of about 2000° K. The carbon flow rate as before stated, is about 7.5 kg per second, the cesium carbonate flow rate is about 0.52 kg per second with the total flow rate into the combustor 16 being about 26.2 kg per second. In the MHD generator 30, the plasma is accelerated in a MHD nozzle at the entrance to the generator to a velocity in the range of from about 1000 meters per second (Mach 1.0) to about 2750 meters per second which is about Mach 3. Lower velocities, pressures and temperatures are used when the predominant product gas is carbon monoxide. The high velocity gas then flows through the MHD generator 30 with a large imposed magnetic field in the range of from about 4 to about 6 Tesla and energy is extracted through a series of electrodes along the generator walls, which is well known. Although a variety of inlet velocities, magnetic field strengths and generating loading parameter exist, one such set of parameters is an inlet static temperature of 3100° K., an inlet static pressure of 10 atmospheres and an inlet velocity of 2750 meters per second. Maximum magnetic fields of 4–6 Tesla and a diffuser exit temperature of about 2600° K. at a pressure of one atmosphere may be used. Under such circumstances, an MHD generator 30 would have a calculated 85% efficiency and the power extracted would be about 112 MWe with a flow rate in the channel of about 26.2 Kgs per second.

As in most MHD generators 30, a diffuser is required at the exit of the generator to recover the kinetic energy of the plasma and reduce the velocity thereof to a relatively low and manageable level. As is known, the electrical output from the channel will be dc power and flows along line 33 to the inverter 50 where it is converted to ac power.

The oxygen preheater 25 is a typical heat exchanger where the combustion gas inlet temperature from line 34 is about 2600° K. and the combustion gas outlet temperature is about 2150° K., the flow rate of the combustion gas being 26.2 kg per second. The oxygen inlet to the preheater 25 from line 20 which is the outlet from the oxygen plant 18 is at a temperature of 300° K. and a flow rate of about 18.18 kg per second. The oxygen outlet temperature in line 26 from the preheater 25, under these circumstances and conditions, is about 2000° K. The MHD generator 30 outlet gases enter the preheater 25 from line 34 at about 2600° K. and exit from the preheater 25 in line 34a at a temperature of about 2150° K. to the secondary combustor 35 which burns the off gases from the MHD generator 30 with the oxygen delivered from the oxygen plant 18 via line 21. The oxygen flow rate to the secondary combustor 35 may be 2.0 kg per second with the inlet temperature being 300° K. The inlet temperature of the combustion gases to the secondary combustor 35 is 2150° K. and the outlet combustion gas temperature after an exothermic combustion is 2600° K. The stoichiometry to the secondary combustor 35 is 0.91, that is an excess of carbon in the form of carbon monoxide, and the stoichiometry out is one with all the carbon monoxide being burned to carbon dioxide. The combustion gas flow rate into the secondary combustor 35 is 26.2 kg per second and the combustion gas flow rate out is 28.2 kg per second, thereby accounting for the 2.0 kg/sec oxygen feed.

The oxygen plant 18 is a cryogenic oxygen plant which receives air in at a flow rate of 173.14 kg per second and delivers oxygen to the MHD generator 30 at a rate of 20.18 kg per second via a line 20 and delivers oxygen via line 22 to the fuel cell 15 at a rate of 20.18 kg per second. The oxygen leaving the plant 18 is at ambient temperature or about 300° K. The oxygen delivered to the fuel cell 15 is at a pressure of about 10 atmospheres and the oxygen delivered from the preheater 25 is at a pressure of about 500 atmospheres. Appropriate valving is required as is well known, but is not shown.

The fuel cell 15 which as hereinbefore described may be of the molten carbonate type or of the solid oxide fuel type with an isentropic efficiency of about 70% produces dc power and uses hydrogen as a fuel and oxygen as the oxidant. The hydrogen flow rate into the fuel cell 15 via a line 14 is about 2.5 kg per second while the oxygen flow rate into the fuel cell is as before stated about 20.18 kg per second. The fuel cell power output is 212 MWe while the water flow rate out of the fuel cell is at about 22.68 kg per second and is dumped via line 52, after recovery of heat therefrom.

The heat/seed recovery unit 40 makes use of the thermal energy in the off gases from the secondary combustor 35 and recovers the residual heat remaining after the off gases have been used to raise the methane temperature in the thermal decomposition unit 12. The combustion gas temperature at the inlet to the recovery unit 40 is about 1700° K. and the combustion gas outlet temperature is about 350° K. The combustion gas flow rate into the unit 40 is about 28.2 kg per second, the seed recovery is at a rate of about 0.52 kg per second and the heat transfer to steam is about 51 MWth. The carbon dioxide flow rate out via a line 42 is 27.68 kg per second. The amount of heat transferred to steam from the combustion off gases in the unit 40 is about 90 MWth.

It should be understood that the foregoing examples may be modified in a variety of ways using different values for flow rates and temperatures, all within the general parameters discussed. The provision of an MHD generator 30 utilizing carbon from a natural gas thermal decomposition and substantially pure oxygen is new.

Figure 2:
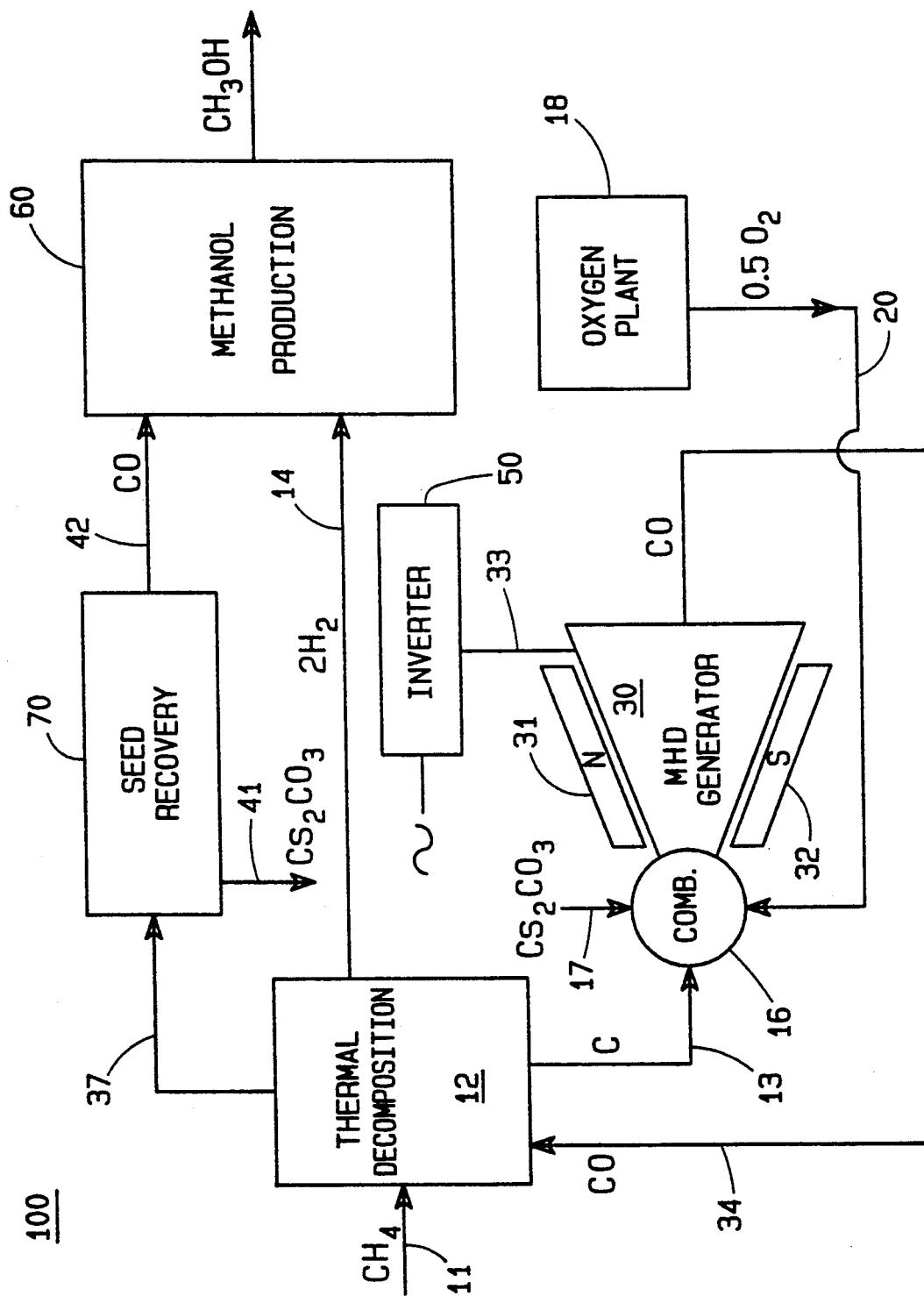
FIG. 2 is a schematic flow diagram of the invention modified for methanol production.

Referring to FIG. 2, it will be seen that a system 100 substantially the same as the system 10 is disclosed. Like reference numbers have been used to identify like equipment. The system 100 differs from the system 10 basically in the absence of the secondary combustor and the provision of a methanol production facility 60. The MHD generator 30 is still utilized in combination with the thermal decomposition unit 12 to burn natural gas or methane from a source thereof which enters the thermal decomposition unit 12 via a line 11. In the system 100 since the secondary combustor and the fuel cell are omitted, the off gas from the MHD generator is principally carbon monoxide (the oxygen plant 18 producing only about a fourth as much oxygen) which is passed from the seed recovery unit 70 to the methanol production unit 60. The methanol production unit 60 receives the same amount of hydrogen gas as the fuel cell does in system 10. By reducing the oxygen flow rate in the stoichiometry to about 0.5, the product of combustion is essentially carbon monoxide.

In the thermal decomposition unit 12, the methane enters at a flow rate of 10 kg/sec and a temperature of 300° K. The carbon flows out at a rate of 7.5 kg/sec and at a temperature of 1500° K., while the combustion products flow through at a rate of 17.95 kg/sec and at an inlet temperature of 2400° K. and an outlet temperature of 500° K. In the combustor 16, the oxygen flows in at a rate of 10.08 kg/sec at a temperature of 300° K., there being no preheating, while the seed material flow rate is 0.38 kg/sec, for a total flow rate of 17.95 kg/sec.

The MHD generator 30 operates at different parameters in system 100 compared to system 10. In system 100, the plasma is accelerated to 1000 m/sec (Mach 1.0) at the generator entrance, the inlet static temperature being 2900° K. and pressure being 27 atmospheres. The maximum magnetic field is in the range of from about 4 to about 6 Tesla. The plasma temperature at the diffuser exit is 2400° K. and the pressure is 1 atmosphere. The MHD generator 30 calculated efficiency is 50% with 22 MWe dc power generated.

The oxygen plant 18 produces 10.09 kg/sec to the combustor 16 at a temperature of 300° K. and 50 atmospheres pressure. The air flow rate into plant 18 is 43.29 kg/sec. The methanol production unit 60 is operated with a carbon monoxide inlet flow rate of 17.59 kg/sec and a hydrogen inlet flow rate of 2.5 kg/sec producing methanol at 20.09 kg/sec.

Figure 3:
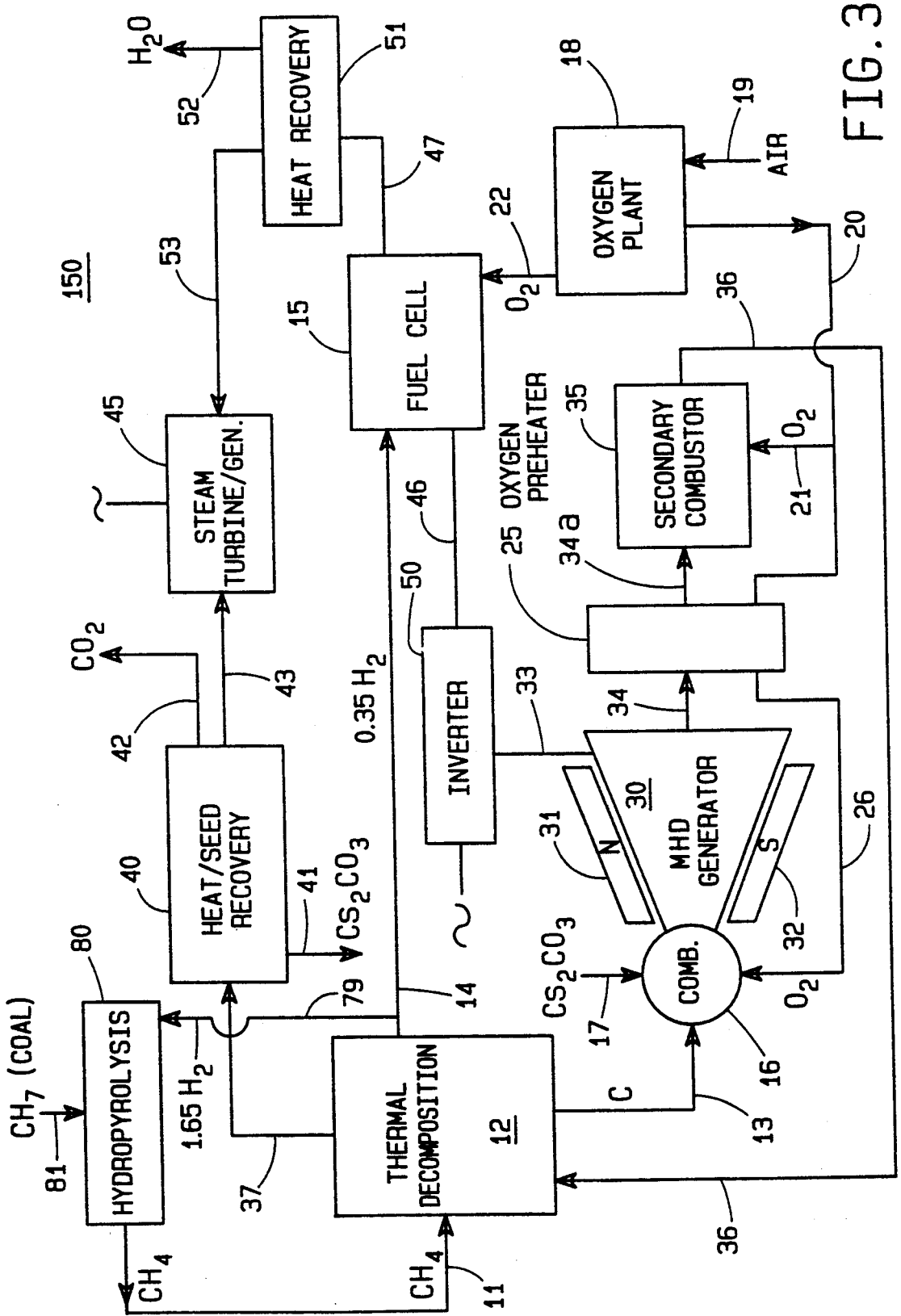
FIG. 3 is a schematic flow diagram of the invention modified to use coal as a starting material.

Referring now to FIG. 3, there is shown another embodiment of the invention wherein like reference numerals are used to identify like pieces of equipment. In the system 150, an MHD generator 30 is also used in combination with a thermal decomposition unit 12 to burn carbon from a line 13 and oxygen from an oxygen plant 18 to produce dc power which is transmitted via a line 33 to an inverter 50. In the system 150, a secondary combustor 35 along with the oxygen preheater 25 is used all as previously described.

The principal difference between the systems 10 and 150 is the provision of an hydropyrolysis unit 80 which converts coal from a source thereof 81 to methane which is transmitted via a line 11 to the thermal decomposition unit 12. Another difference is that a portion of the hydrogen gas produced from the thermal decomposition unit 12 is transmitted via a line 79 to the hydropyrolysis unit 80 and another portion is transmitted via a line 14 to the fuel cell 15. In general, the hydropyrolysis unit 80 is operated at a temperature of about 800°–1400° K. with 1000° K. being preferred. The unit 80 is also operated at a pressure in the range of from 1 to about 5 atmospheres, the preferred pressure being in the 3–4 atmospheres range. For each 2 moles of hydrogen gas produced 1.65 mole of hydrogen is transmitted to the unit 80 and 0.35 moles is transmitted to the fuel cell 15, thereby reducing the volume of oxygen needed to operate the fuel cell 15. The hydropyrolysis unit 80 operates at the following parameters: For a coal flow rate of 8.0 kg/sec at a temperature of about 550° K. the hydrogen flow rate required is about 2.06 kg/sec at a temperature of about 1400° K. The methane produced from the unit 80 is at a flow rate of about 10 kg/sec and a temperature of about 1100° to about 1200° K. In the system 150, the oxygen requirements from oxygen plant 18 are less than for system 10, the oxygen flow rate to the MHD generator 30 being 20.18 kg/sec, the oxygen flow rate to the fuel cell 15 being 3.50 kg/sec and the air flow rate being 101.71 kg/sec. Similarly, the fuel cell 15 operates to produce less power, the hydrogen flow rate in is 0.44 kg/sec, the oxygen in flow rate is 3.53 kg/sec, the power out is 37 MWe and the water out flow rate is 3.97 kg/sec. The heat transferred to steam from the fuel cell 15 is 15.75 MWe.

Figure 4:
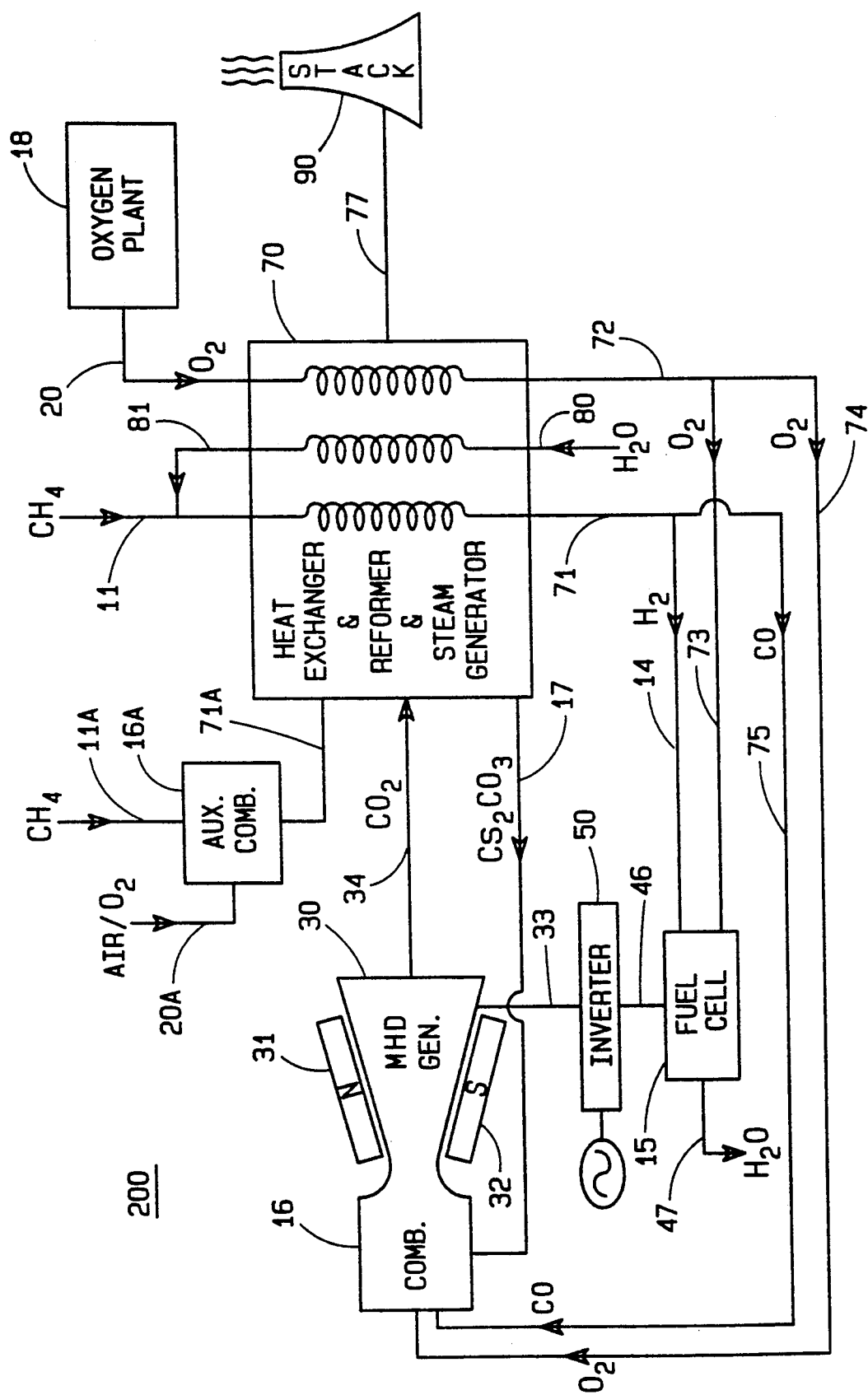
FIG. 4 is a schematic flow diagram of the invention to use natural gas and steam as starting materials.

Referring now to FIG. 4, there is disclosed an embodiment 200 which is similar to the previously described systems 10, 100 and 150. The principal difference in the system 200 is the use of natural gas and more specifically, methane a component of natural gas and steam to form carbon monoxide which is thereafter introduced along with oxygen from the oxygen plant to the combustor. An auxiliary combustor is also present in the embodiment 200 which is not present in the previous embodiments, for a purpose hereinafter set forth.

Referring now to FIG. 4, there is shown a source of natural gas which is transmitted via a line 11 to a combination unit 70. The combination unit 70 includes a heat exchanger, a methane reformer and a steam generator, all in combination, where the methane in line 11 is heated by means of de-accelerated plasma from the MHD generator 30 which is transmitted to the unit 70 via means of a line 34. Water from a source thereof is transmitted via a line 80 into the unit 70 where it is heated to steam and exits from the unit 70 by line 81 where it is introduced into the line 11 so that a combination of methane and steam is introduced into the unit 70 for additional heating. In the unit 70, a chemical reaction takes place between the methane and steam in line 11 to form carbon monoxide and hydrogen which exits the unit 70 by line 71. The hydrogen in line 71 is fed via a line 14 to a fuel cell 15, as previously described, from which dc power is transmitted via a line 46 to an inverter 50 to convert the dc power to ac power, while waste water is dumped via a line 47 from the fuel cell 15. Also exiting from the unit 70 is a carbon monoxide component which is transmitted via a line 75 to a combustor 16 which is in communication with a MHD generator 30 having superconducting magnets having a north pole 31 and a south pole 32, the superconducting magnets being the same as previously described with respect to the prior embodiments and being capable of providing a magnetic field in the range of from about 4 to about 6 Tesla.

Oxygen from an oxygen plant 18 is transmitted by a line 20 through the unit 70 to be preheated and exits therefrom in a line 72 which is divided, a portion of which is transmitted to the fuel cell 15 via a line 73 and the other portion of which is transmitted via a line 74 to the combustor 16 to react with the carbon monoxide formed during the chemical reaction between methane and steam. The plasma exiting the MHD generator 30 is fundamentally carbon dioxide with seed material which may be either the cesium carbonate shown or potassium carbonate which is recycled in the unit 70 via a line 17 to the combustor 16. Carbon dioxide exits the unit 70 via a line 77 to a stack 90 where it is vented to the atmosphere.

An auxiliary combustor 16A is required to make up sufficient heat to accommodate the reformation reaction of methane and steam as well as the heat requirement to convert the water to steam and the heating requirement for the oxygen all of which takes place in the unit 70. To that end, an auxiliary source of methane or natural gas is transmitted by a line 11A to the auxiliary combustor 16A along with air or oxygen via a line 20A wherein the reactants combine to form carbon monoxide and hydrogen, the heat from which is transmitted via a line 71A to the unit 70 to assist in the thermal requirements for the reformer combination unit 70.

Preliminary calculations indicate performance requirements for the individual components illustrated in FIG. 4 as follows:

| MHD Combustor: | |
|---|---|
| Pressure - | 100 atm. |
| Stagnation Temperature | 3600° K. |
| Heat Loss | 5.0% |
| Stoichiometry | 1.0 |
| Cesium Seed | 2.5% by weight |
| Flow Rate of CO | 17.5 kg/sec |
| Flow Rate of O2 | 10 kg/sec |
| MHD Generator: | |
| Isentropic efficiency | 80% |
| Inlet Temperature | ~2800° K. |
| Inlet pressure | ~10 atm |
| Inlet conductivity | ~40 S/M |
| Inlet Mach Number | ~2.0 |
| Output power | ~68.7 MWe |
| Fuel Cell: | |
| Isentropic efficiency | 70% |
| Hydrogen flow rate | 3.75 kg/sec |
| Oxygen flow rate | 30 kg/sec |
| Output power | 357 MWe |
| Operating temperature | 1000° K. |
| Oxygen Plant: | |
| Energy requirement | 200 kw-hr/ton |
| Pressure | 50–100 atm |
| Total flow rate | 40 kg/sec |
| Total energy req'd | 32 MWe |
| Thermal energy to heat | 28.1 MWth |
| Methane Reformer: | |
| Methane flow rate | 10 kg/sec |
| Methane thermal input | 500 MWth |
| Steam flow rate | 11.25 kg/sec |
| Reformer temperature | 1000° K. |
| Reformer pressure | 50–100 atm |
| Thermal energy (steam) | 38.6 MWth |
| Thermal energy (reform) | 170.1 MWth |
| Auxiliary Combustor: | |
| Methane flow rate | 2.25 kg/sec |
| Methane thermal input | 112 MWth |
| Oxidant | Air |

$$\text{Cycle efficiency} = \frac{\text{Power (MHD)} + \text{Power (Fuel Cell)} - \text{Power (O}_2\text{)}}{\text{Heat Input (Methane Reform.} + \text{Aux. comb.)}}$$

$$\text{Cycle eff.} = \frac{68.7 + 357 - 32}{500 + 112} = 64.3\%$$

The auxiliary methane combustor 16A is necessary because the $CO_2$ stream exiting the MHD generator/diffuser does not have sufficient thermal capacity to heat the oxygen, raise steam for the reformation, and reform the methane to CO and $H_2$. The oxidizer for the auxiliary combustor 16A can be either $O_2$ or air depending on the overall system requirements. The system would be slightly less efficient if oxygen is used.

It should be clear that a general system and method of using methane, from various sources, and pure oxygen in conjunction with an MHD generator and perhaps a fuel cell have been disclosed. Various parameters of operation may be employed and although a few specific system parameters have been disclosed they should in no way be considered limiting but merely as illustrative of the invention. For example, it will be clear to one skilled in the art, that the dc Power generated by the MHD generators or by the fuel cells, may be collected as electrical energy without conversion to ac power.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of converting chemical energy of methane to electrical energy, comprising reacting steam and the methane to form hydrogen and carbon monoxide at an elevated temperature and at an elevated pressure not less than about 50 atmospheres, transmitting the carbon monoxide to a MHD combustor, introducing substantially pure oxygen and a cesium or potassium seed material to the MHD combustor and maintaining the seed material with the carbon monoxide at a pressure of at least about 50 atmospheres to combust the carbon monoxide and the oxygen to provide an ionized plasma having a temperature not less that about 2800° K. accelerating the ionized plasma to a velocity not less than about 1000 m/sec and transporting the ionized plasma through an MHD generator having a magnetic field in the range of from about 4 to about 6 Tesla to generate dc power, de-accelerating the ionized plasma and passing the ionized plasma from the MHD generator in heat exchange relationship with methane and with water to create the steam for the methane-steam reaction, recovering the cesium or potassium seed material and transporting the seed material to the combustor, and collecting the dc power from the MHD generator as at least a portion of the electrical energy.

2. The method of claim 1, wherein the hydrogen from the methane-steam reaction is transmitted to a fuel cell as fuel to produce dc power.

3. The method of claim 2, wherein the fuel cell is selected from one of a solid oxide fuel cell and a molten carbonate fuel cell.

4. The method of claim 2, and further comprising combusting additional methane to provide additional heat for the methane-steam reaction.

5. The method of claim 2, wherein the methane-steam reaction occurs at a temperature of about 1000° K. and at a pressure in the range of from about 50 to about 100 atmospheres.

6. The method of claim 4, wherein the combustion of the additional methane is with air.

7. The method of claim 1, wherein the MHD combustor is operated at a pressure of about 100 atmospheres and a stagnation temperature of about 3600° K. with the stoichiometry of the carbon monoxide and the oxygen being about 1.

8. The method of claim 1, wherein the MHD generator is operated with an inlet temperature of about 2800° K. and pressure of about 10 atmospheres, the ionized plasma velocity being about 2000 m/sec.

9. The method of claim 2, wherein the fuel cell is operated at a temperature of about 1000° K.

10. A sytem for converting chemical energy of methane to electrical energy, comprising a combination methane reformer and steam generator and heat exchange unit for heating water to create steam and for reacting the steam and the methane to produce carbon monoxide and hydrogen and for heating substantially pure oxygen, a MHD combustion unit for combusting the carbon monoxide with the substantially heated oxygen and a potassium or cesium seed material to produce an ionized plasma, gases resulting from the reactions, having a temperature not less than about 2800° K., an MHD generator for accelerating the gases to a velocity of not less than about 1000 m/sec and having a magnetic field in the range of from about 4 to about 6 Tesla to produce dc power, means for transmitting the gases leaving the MHD generator to the combination methane reformer and steam generator and heat exchange unit to pass the gases in heat exchange relationship with the methane and the water and the oxygen to heat the methane, water and oxygen, and means for collecting the dc power from said MHD generator as at least a portion of the electric energy.

11. The system of claim 10, further comprising a source of the substantially pure oxygen, a fuel cell operatively connected to said combination unit and said oxygen source for receiving the hydrogen produced from the methane reformation and the oxygen for producing the dc power for transmission to said inverter and means in communication with the gases for recovering the material for transportation to said MHD combustion unit.

12. The system of claim 11, and further comprising an auxiliary combustion unit for combusting a portion of the methane to add heat to said combination unit.

13. The method of claim 2 wherein the dc power from the MHD generator and from the fuel cell is converted to ac power.

14. The method of claim 11 wherein the dc power from the MHD generator and from the fuel cell is connected to an inverter for converting dc power to ac power.

* * * * *